United States Patent [19]
Gerlowski et al.

[11] Patent Number: 4,866,122
[45] Date of Patent: Sep. 12, 1989

[54] BLENDS OF POLYKETONE POLYMERS WITH POLYVINYL ALCOHOL

[75] Inventors: Leonard E. Gerlowski; John R. Kastelic, both of Katy, Tex.; Robert G. Lutz, Santa Rosa, Calif.

[73] Assignee: Shell Oil Company, Houston, Tex.

[21] Appl. No.: 187,190

[22] Filed: Apr. 28, 1988

[51] Int. Cl.$^4$ .............................................. C08G 67/02
[52] U.S. Cl. ....................................... 525/58; 525/56; 525/60; 528/392
[58] Field of Search ............................ 525/56, 58, 60; 528/392; 428/500, 524

[56] References Cited

U.S. PATENT DOCUMENTS

| | | |
|---|---|---|
| 2,495,286 | 1/1950 | Brubaker .............................. 528/392 |
| 3,585,177 | 6/1971 | Gardner et al. . |
| 3,694,412 | 9/1972 | Nozaki . |
| 3,925,336 | 12/1975 | Sawada . |
| 4,293,473 | 10/1981 | Eastman . |
| 4,347,332 | 8/1982 | Odorzynski . |
| 4,427,825 | 1/1984 | Degrassi . |
| 4,468,427 | 8/1984 | Degrassi .............................. 428/220 |
| 4,552,801 | 11/1985 | Odorzynski ......................... 428/220 |

FOREIGN PATENT DOCUMENTS

| | | |
|---|---|---|
| 0121965 | 10/1984 | European Pat. Off. . |
| 0181014 | 5/1986 | European Pat. Off. . |
| 1081304 | 8/1967 | United Kingdom . |

Primary Examiner—Harold D. Anderson
Assistant Examiner—T. Mason
Attorney, Agent, or Firm—Dean F. Vance

[57] ABSTRACT

A composition comprising:
  (a) at least one linear alternating copolymer of carbon monoxide and an ethylenically unsaturated hydrocarbon; and
  (b) a vinyl alcohol polymer, as well as articles prepared therefrom and packaging materials prepared therefrom.

24 Claims, No Drawings

BLENDS OF POLYKETONE POLYMERS WITH POLYVINYL ALCOHOL

BACKGROUND OF THE INVENTION

1. Field of the Invention

This invention relates to improved polymer blends comprising, a linear alternating polymer of carbon monoxide and at least one ethylenically unsaturated hydrocarbon. More particularly, the invention relates to blends comprising the linear alternating polymer and a polyvinyl alcohol, such as ethylene vinyl alcohol.

The general class of polyketone polymers of carbon monoxide and olefin(s) has been known for some years. Brubaker, U.S. 2,495,286, produced such polymers of relatively low carbon monoxide content in the presence of free radical initiators, such as peroxy compounds like benzoyl peroxide. British Patent 1,081,304 produced similar polymers of higher carbon monoxide content in the presence of alkylphosphine complexes of palladium as catalyst. Nozaki extended the process to linear alternating polymers in the presence of arylphosphine complexes of palladium moieties and certain inert solvents. See, for exmaple, U.S. 3,694,412.

More recently, the class of linear alternating polymers of carbon monoxide and unsaturated hydrocarbons, e.g., ethylene or ethylene and propylene, has become of greater interest in part because of the greater availability of the polymers. These polymers, often referred to as polyketones or polyketone polymers, have been shown to be of the repeating formula —CO—(A)— where A is the moiety of an ethylenically unsaturated hydrocarbon polymerized through the ethylenic unsaturation. For example, when the ethylenically unsaturated hydrocarbon is ethylene, the polymer is represented by the repeating formula $-CO-(CH_2-CH_2)-$. The general process for the more recent production of such polymers is illustrated by a number of published European patent applications including 0,121,965 and 0,181,014. The process typically involves a catalyst composition formed from a compound of a Group VIII metal selected from palladium, cobalt or nickel, the anion of a strong non-hydrohalogenic acid and a bidentate ligand of phosphorous, arsenic or antimony.

The resulting thermoplastic polymers having utility in the production of articles such as parts for the automotive industry, as structural members for use in the constructon industry, and as containers for the packaging industry.

Such shaped parts are produced by processing the polyketone according to known methods. For some applications it has been found desirable to provide a polymer composition having properties somewhat different from those of the polyketone polymers. It would be of advantage to retain the more desirable properties of the polyketone polymer and yet improve other properties. This advantage is often obtained through the provision of a polymer blend, with polyvinyl alcohol.

This invention also relates to a packaging material prepared from a blend of a linear alternating polymer of carbon monoxide and at least one ethylenically unsaturated hydrocarbon with a polyvinyl alcohol, such as ethylene vinyl alcohol.

Polymer systems such as fully hydrolyzed polyvinyl alcohol have very high resistance to oxygen permeability, but these systems have serious deficiencies in that they are water sensitive and have a very high water vapor transmission rate. Furthermore, these polyvinyl alcohol polymers fail to retain their excellent resistance to oxygen permeability at conditions of high humidity, and, in general have poor processing characteristics, which precludes thermal processing into shaped articles. The poor thermal processability stems from the necessity of heating the resin above its melting point (180° C. is the point at which polyvinyl alcohol decomposes) and under these conditions the resin undergoes thermal decomposition.

The currently available olefin/vinyl alcohol copolymers are characterized by a thermal processing behavior and barrier properties which limits their utility as packaging materials. Notable among these deficiencies is the tendency of the resin to develop gel specks and/or burn spots during the extrusion process. Furthermore, the broad distribution of olefin content in the available olefin/vinyl alcohol resins results in poor water vapor transmission rate (WVTR) properties.

A definite need exists for a blend material which has a high resistance to oxygen permeability and a low water vapor transmission rate as well as improved processing and physical properties to allow their fabrication into diverse shapes and sizes, e.g., bottles, containers, sheets, thin films, etc.

It is therefore an object of this invention to provide a novel packaging materials for foods, medicines, and related objects, wherein the packaging materials exhibit a high resistance to oxygen permeability and a low water vapor transmission as well as improved processing and physical properties.

It is a further object of this invention to provide for foods, medicines, and other related substances, a novel packaging material which exhibits high resistance to oxygen permeability and a low water vapor transmission rate as well as improved processing and physical properties.

These and other objects are obtained by providing a novel blend, such as for packaging materials for foods, medicines and other related substances, which comprises (i) a lower α-olefin/vinyl alcohol copolymer wherein the vinyl alcohol is between 30 to 50% by weight, and the residual non-hydrolyzed fraction of the vinyl alcohol portion is below 3.0–15%; and (ii) a novel polyketone polymer.

SUMMARY OF THE INVENTION

The present invention contemplates the provision of blends of a linear alternating polymer of carbon monoxide and at least one ethylenically unsaturated hydrocarbon and certain other polymeric materials. More particularly, according to the invention, there are provided blends of the linear alternating polymer with a proportion of a vinyl alcohol polymer.

DESCRIPTION OF THE INVENTION

The polyketone polymers which are employed as a component of the blends of the invention are linear alternating polymers of carbon monoxide and at least one ethylenically unsaturated hydrocarbon. Suitable ethylenically unsaturated hydrocarbons for use as precursors of the polyketone polymers have up to 20 carbon atoms inclusive, preferably up to 10 carbon atoms inclusive, and are aliphatic such as ethylene and other α-olefins including propylene, butylene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-methylstyrene. Preferred polyketone polymers are copolymers of carbon monoxide and ethylene or terpolymers of carbon monoxide, ethylene and a second hydrocarbon, particularly an α-olefin of at least 3 carbon atoms such as propylene.

The structure of the polyketone polymer component of the blends of the invention is that of a linear alternating polymer of carbon monoxide and unsaturated hydrocarbon and the polymer will contain substantially one molecule of carbon monoxide for each molecule of unsaturated hydrocarbon. When terpolymers of carbon monoxide, ethylene and a second hydrocarbon are employed in the blends of the invention, there will be within the terpolymer at least two units incorporating a moiety of ethylene per unit incorporating a moiety of the second hydrocarbon preferably from about 10 units to about 100 units incorporating a moiety of ethylene for each unit incorporating a moiety of the second hydrocarbon. The polymer chain is therefore illustrated by the formula

$$CO-(CH_2-CH_2)\ CO-13\ (B)$$

where B is the moiety obtained by polymerization of the second hydrocarbon through the ethylenic unsaturation. The $-CO\ (CH_2-CH_2)$ units and the $-CO-(B)-$ units are found randomly throughout the polymer chain and the ratio of y:x is no more than about 0.5. In the modification where copolymers of carbon monoxide and ethylene are employed in the blends of the invention and there is no second hydrocarbon present in the polymer chain, the polymers are represented by the above formula wherein y=0. When y is other than 0, as in the case of terpolymers, ratios of y:x from about 0.01 to about 0.2 are preferred. The end groups or "caps" of the polymer chain will depend upon what materials were present during the preparation of the polymer and how and whether the polymer was purified. The precise nature of the end groups is of little significance with regard to the overall properties of the polymer so that the polyketone polymer is fairly represented by the above formula.

Of particular interest are the polymers of molecular weight from about 1,000 to about 500,000, particularly those of molecular weight from about 10,000 to about 50,000.

The physical properties of such polymers depend in part on the molecular weight of the polymer, whether the polymer is a copolymer or a terpolymer and the relative proportion of the second hydrocarbon present in the case of terpolymers. Typical melting points of such polymers are from about 175° C. to about 300° C., more frequently from about 180° C. to about 285° C.

A method of producing polyketone polymers which is now becoming conventional is to contact the carbon monoxide and unsaturated hydrocarbon(s) with a catalyst composition formed from a palladium compound, the anion of a non-hydrohalogenic acid having a pKa below about 6 and a bidentate phosphorus ligand. The scope of the process for polyketone production is substantial, and without wishing to be limited, a preferred palladium compound is a palladium carboxylate, particularly palladium acetate, the preferred anion is the anion of trifluoroacetic acid or p-toluenesulfonic acid and the preferred bidentate phosphorus ligand is 1,3-bis(diphenylphosphino)propane or 1,3-bis[di(2-methoxyphenyl)phosphino]propane. Such a process for polyketone production is illustrated by copending U.S. patent application Serial No. 930,468, filed Nov. 14, 1986.

Polymerization is conducted under polymerization conditions as the gaseous phase or in a liquid phase in the presence of a reaction diluent such as an alkanol, e.g. methanol or ethanol. The reactants and catalyst composition are contacted by conventional methods such as shaking or stirring in a suitable reaction vessel. Suitable reaction temperatures are from about 20° C. to about 150° C. with preferred temperatures being from about 50° C. to about 130° C. Typical reaction pressures are from about 1 bar to about 200 bar, more typically from about 10 bar to about 100 bar. Subsequent to reaction the polyketone product is recovered as by filtration or decantation. The polyketone polymer may contain residues of the catalyst composition which are removed, if desired, by treatment with a solvent or a complexing agent which is selective for the residues.

Useful polyketones for blends herein have limiting viscosity numbers (LVN) as measured by the method wherein the polymer is dissolved in metacresol at 60° C., using a standard capillary viscosity measuring device, such as a Cannon-Ubbelohde viscometer. All LVN values herein are based on this 60° C. determination unless otherwise noted. Particularly useful polyketones have LVN values in the range of 0.5 to 10 and within the range of 0.8 to 5 LVN are preferred. 0.8 to 2.5 LVN is another preferred range for polyketone polymer usable herein.

The blends of the invention are polyketone polymer with a quantity of the polyvinyl alcohol. The precise percentage of the polyvinyl alcohol polymer in the blend is not critical and the amount of the polyvinyl alcohol can range from 1:99 parts by weight of the blend incorporating the polyketone polymer.

The vinyl alcohol polymer suitable for the present invention can be polyvinyl alcohol or more preferably, ethylene/vinyl alcohol (EVOH) copolymer containing at least 20 mole percent vinyl alcohol and up to 50 mole% ethylene. At least 30 mole percent vinyl alcohol copolymer is preferred for use herein. A more preferred range is 30-50 mole percent with 32-44 mole percent being most preferred. All commercial grades of polymer alcohol can be employed as the blend component. Pure polyvinyl alcohol is usable herein, but in the context of a unique packaging material, is not preferred due to possible food-water-package interactions. EVOH is preferred because of its lower interaction with water-based substances. These grades include both completely hydrolyzed (i.e., about 99 percent or higher) and partially hydrolyzed (about 80 percent) types.

The amount of polyvinyl alcohol or EVOH copolymer in the composition of the present invention can be from about 2 to about 35 percent by weight, but can be up to 99 percent by weight of the blend depending on the desired end use.

The preferred olefin/vinyl alcohol packaging materials are ethylene/vinyl alcohol copolymers wherein the ethylene content is from 5 to 40 weight percent based on the weight of the copolymer. Especially preferred are ethylene/vinyl alcohol copolymers wherein the ethylene content is from 8:9 to 36.7 weight percent based on the weight of the copolymer. Most especially preferred are ethylene/vinyl alcohol copolymers wherein the ethyelen content is from 12 to 29.8 weight percent based on the weight of the copolymer.

Ethylene vinyl alcohols particularly usable herein include EVAL E ™ and EVAL F ™ available from Kuraray Corporation.

One exemplary method for preparing ethylene-vinyl alcohol (EVAL) copolymers is disclosed in U.S. Patent No. 3,925,336 and 3,585,177. Blends of ethylene vinyl alcohol with other polymers are disclosed in U.S. Patent No. 4,293,473.

The polymer composition, in addition to polyketone polymer, and vinyl alcohol, may incorporate conventional additives which are inert to the polyketone polymer and vinyl alcohol, such as processing aids, plasticizers, mold release agents, antioxidants, pigments, other fillers and reinforcements, such as talc and glass fibers, and glass modifiers which are added by blending or other conventional methods.

The method of blending the polyketone and the polyvinyl alcohol is not material so long as a uniform mixture of the two components is obtained without undue degradation of the components or the resulting blend. In one modification the components are extruded to produce the blend as an extrudate. In an alternate modification, the components are blended in a mixing device which exhibits high shear. The components can be blended in low shear mixing apparatus, as well or by kinetic compounding. The polyketone polyvinyl alcohol blends of the invention are blends having a variety of usable properties.

The blended compositions are processed by conventional methods, such as injection molding, pressure forming, thermoforming, sheet extrusion and sheet casting, which do not serve to degrade the polymer of the composition. Such additives can be incorporated within the blend or blend components prior to, together with or subsequent to the blending of the polyketone or polyvinyl alcohol.

It is to be understood that in the specification and claims herein, unless otherwise indicated, the amount of the ethylene vinyl alcohol or polyketone is expressed in terms of percent by weight, it is meant percent by weight based on the total amount of the blend.

The sheets or thermoformed materials can be further processed by conventional methods into plates, and other molded objects.

The present invention also relates to a packaging material wherein the material exhibits oxygen permeability of less than 15 cc mil/100 in$^2$ 24 hr. atm at 30° C. and water vapor transmission of less than 20 grams mil/100 inch$^2$/24 hr. at 38° C. and 90% relative humidity (RH), and comprises:

component (a): at least one linear alternating polymer of carbon monoxide and an ethylenically unsaturated hydrocarbon; and component (b): a vinyl alcohol polymer containing at least 50 mol percent vinyl alcohol.

The invention is further illustrated by the following illustrative Embodiments which should not be construed as limiting the invention. The first series of Illustrative Embodiments 1 to 13 simply describe the novel polyketone polymers usable in the unique blends.

Illustrative Embodiment 1

A linear alternating terpolymer 055/014 of carbon monoxide, ethylene and propylene, (5% C$_3$), was produced by contacting the monomers in the presence of a catalyst composition formed from palladium acetate, the anion of trifluoroacetic acid and 1,3-bis-(diphenylphosphino)propane. The melting point of the terpolymer was 226° C. and the terpolymer had a limiting viscosity number (LVN) of 1.89 measured at 100°C. in m-cresol.

Illustrative Embodiment 2

A linear alternating terpolymer 055/020 of carbon monoxide, ethylene and propylene, (5.8% C$_3$), was produced by contacting the monomers in the presence of a catalyst composition formed from palladium acetate, the anion of trifluoroacetic acid and 1,3-bis-(diphenylphosphino)propane. 0.3% of Irganox 1010 was added to the polymer. The melting point of the terpolymer was 221° C. and the terpolymer had a limiting viscosity number (LVN) of 1.0 measured at 100° C. in m-cresol.

Illustrative Embodiment 3

A linear alternating terpolymer 055/021 of carbon monoxide, ethylene and propylene, (5.5% C$_3$), was produced by contacting the monomers in the presence of a catalyst composition formed from palladium acetate, the anion of trifluoroacetic acid and 1,3-bis-(diphenylphosphino)propane. 0.3% of Irganox 1010 was added to the polymer. The melting point of the terpolymer was 223° C. and the terpolymer had a limiting viscosity number (LVN) of 0.7 measured at 100° C. in m-cresol.

Illustrative Embodiment 4

A linear alternating terpolymer 055/022 of carbon monoxide, ethylene and propylene, (5.5% C$_3$), was produced by contacting the monomers in the presence of a catalyst composition formed from palladium acetate, the anion of trifluoroacetic acid and 1,3-bis-(diphenylphosphino)propane. 0.3% of Irganox 1010 was added to the polymer. The melting point of the terpolymer was 223° C. and the terpolymer had a limiting viscosity number (LVN) of 0.7 measured at 100° C. in m-cresol.

Illustrative Embodiment 5

A linear alternating terpolymer 055/037 of carbon monoxide, ethylene and propylene, (6.4% C$_3$), was produced by contacting the monomers in the presence of a catalyst composition formed from palladium acetate, the anion of trifluoroacetic acid and 1,3-bis-(diphenylphosphino)propane. 0.3% of Irganox 1076 was added to the polymer. The melting point of the terpolymer was 217° C. and the terpolymer had a limiting viscosity number (LVN) of 1.7 measured at 100° C. in m-cresol.

Illustrative Embodiment 6

A linear alternating terpolymer 055/038 of carbon monoxide, ethylene and propylene, (7.0% C$_3$), was produced by contacting the monomers in the presence of a catalyst composition formed from palladium acetate, the anion of trifluoroacetic acid and 1,3-bis-(diphenylphosphino)propane. 0.3% of Irganox 1076 was added to the polymer. The melting point of the terpolymer was 214° C. and the terpolymer had a limiting viscosity number (LVN) of 1.4 measured at 100° C. in m-cresol.

Illustrative Embodiment 7

A linear alternating copolymer 055/012 of carbon monoxide, and ethylene was produced by contacting the monomers in the presence of a catalyst composition formed from palladium acetate the anion of trifluoroacetic acid and 1,3-bis-(diphenylphosphino)propane. 0.5% by weight Irganox 1010 was added to the polymer. The melting point of the copolymer was 206° C. and the polymer had a limiting viscosity number (LVN) of 1.37 measured at 100° C. in m-cresol.

Illustrative Embodiment 8

A linear alternating copolymer 055/010 of carbon monoxide, and ethylene was produced by contacting the monomers in the presence of a catalyst composition formed from palladium acetate, the anion of trifluoroacetic acid and 1,3-bis-(diphenylphosphino)propane. The melting point of the copolymer was 250° C. and the polymer had a limiting viscosity number (LVN) of 2.2 as measured at 100° C. in m-cresol.

Illustrative Embodiment 9

A linear alternating copolymer 054/005 of carbon monoxide, and ethylene was produced by contacting the monomers in the presence of a catalyst composition formed from palladium acetate, the anion of trifluoroacetic acid and 1,3-bis-(diphenylphosphino)propane. The melting point of the copolymer was 257° C. and the polymer had a limiting viscosity number (LVN) of 3.05 measured at 100° C. in m-cresol.

Illustrative Embodiment 9

A linear alternating terpolymer 055/022 of carbon monoxide, ethylene and propylene, (4.7% $C_3$), was produced by contacting the monomers in the presence of a catalyst composition formed from palladium acetate, the anion of trifluoroacetic acid and 1,3-bis-(diphenylphosphino)propane. 0.3 wt% Irganox 1010 was added to this polymer. The melting point of the terpolymer was 223° C. and the terpolymer had a limiting viscosity number (LVN) of 1.9 measured at 100° C. in m-cresol.

Measurements for permeability were made on compression molded films from powder or nibs of the polyketone polymer of Embodiment 1-10. To make these films, the polyketone polymers were separately heated to about 20° C. above the melt point and cooled after molding, out of the press. This operation was done to represent a standard melt processed sample. Film samples produced in this manner are referred to as neat polymers.

Neat films produced with this described technique were measured for gas permeability using standard Mocon equipment similar to ASTM procedure D1434-63 for oxygen permeability and for water vapor transmission rates (WVTR) using standard Mocon equipment in the manner of ASTM procedure E-96-63T.

TABLE I

| | Gas and Water Permeability Values of Neat Carilon Polymers | | | | | |
|---|---|---|---|---|---|---|
| Polymer | t(mils) | $O_2^1$ | $CO_2^1$ | $H_2O^2$ | Hfus(l)$^3$ | Crystal$^4$ |
| Carilon-EP Polymers | | | | | | |
| 055/014 | 11.0 | 2.64 | 15.4 | 7.9 | 20.3 | 0.356 |
| 055/020 | 9.2 | 3.22 | 16.6 | 6.9 | 22.9 | 0.402 |
| 055/020 | 11.4 | 3.65 | 18.7 | 16.6 | 22.9 | 0.402 |
| 055/021 | 7.8 | 2.77 | 26.4 | — | 22.4 | 0.393 |
| 055/022 | 11.8 | 4.95 | 23.0 | 17.6 | 19.0 | 0.333 |
| 055/022 | 10.1 | 3.30 | 23.1 | — | 19.0 | 0.333 |
| 055/037 | 5.6 | 2.69 | 20.1 | 12.2 | 32.8 | 0.575 |
| 055/037 | 12.7 | 4.57 | 27.3 | — | 19.1 | 0.335 |
| 055/037 | 11.7 | 3.39 | 24.8 | — | 19.1 | 0.335 |
| 055/038 | 0.8 | 8.52 | 69.9 | — | 19.5 | 0.342 |

TABLE I-continued

| | Gas and Water Permeability Values of Neat Carilon Polymers | | | | | |
|---|---|---|---|---|---|---|
| Polymer | t(mils) | $O_2^1$ | $CO_2^1$ | $H_2O^2$ | Hfus(l)$^3$ | Crystal$^4$ |
| 055/038 | 0.9 | 5.97 | 48.3 | — | 19.2 | 0.337 |
| 055/038 | 0.9 | 7.29 | 57.0 | — | 18.0 | 0.316 |
| 055/038 | 0.8 | 8.80 | 65.6 | — | 18.6 | 0.326 |
| Carilon-E Polymers | | | | | | |
| 055/012 | 9.3 | 4.65 | 29.6 | 6.7 | 18.3 | 0.333 |
| 055/012 | 9.3 | 5.30 | 21.0 | 3.5 | 18.3 | 0.333 |
| 055/012 | 8.0 | 4.32 | 38.4 | 3.5 | 18.3 | 0.333 |
| 055/010 | 11.1 | 3.66 | 25.6 | 4.5 | 27.7 | 0.504 |

$^1$units = cc(STP)-mil/100 sqin-d-atm at 30° C.
$^2$units = gm-mil/100 sqin-d at 90% RH and 100° F.
$^3$units = cal/gm.
$^4$fraction crystalline.

TABLE II

| | Water Transport Parameters of Neat Carilon Polymers | | |
|---|---|---|---|
| Polymer | Permeability Coefficient (gm-ml 100 sqin-d) | Diffusion Coefficient $D(cm^2/s \times 10^8)$ | Sorption Coefficient $S(kg/m^3)$ |
| Carilon E (054/005) | 24.5 | 4.8 | 27.9 |
| Carilon EP (055/022) 4.7% Propylene | 4.59 | 0.75 | 27.9 |
| Carilon EP (055/012) 8.5% Propylene | 4.72 | 0.92 | 23.4 |
| Polyvinyl-alcohol$^1$ | 87 | 1.0 | 36.0 |

$^1$EVAL EPF available from Kuraray in 1986.

It should be noted that crystalline levels of the neat polyketone polymers, were determined using an ideal heat of fusion of 54.5 cal/gm for Carilon E copolymer and 56.9 cal/gm for Carilon EP (218°-224° C. mp) terpolymer having a $C_3$ content rangign from 0.1 to 20%. With these ideal values, measurements from Differential Scanning Calorimetry (DSC) were used to estimate the degree of crystallinity for a given sample. The DSC testing was heated with a Perkin-Elmer Differential Scanning Calorimeter (DSC) which employed samples of the polyketone in sealed pan containers. The pan and contents were heated at a controlled rate, typically 20° C./minute, until the sample melted. The pan and contents were then cooled until the sample solidified. The solidified sample was again heated, past a second melting point, to about 285° C. and maintained at that temperature for about 10 minutes. The pan and contents were then cooled until the sample solidified a second time. The crystallization or solidification temperature was defined as the temperature at which the heat flow reached a minimum. The relative melt stability of the blend was calculated as the ratio of the second crystallization temperature of the blend to the second crystallization temperature of the polyketone from which it was formed.

Time lag measurements of carbon dioxide transport through several Carilon films are used to determine the diffusion coefficient. The diffusion coefficient was dependent on the degree of crystallinity by the equation:

$$D = D_{am}(l - X)$$

where D was the measured diffusion coefficient, $D_{am}$ was the amorphous phase diffusion coefficient, and X was the degree of crystallinity. Once the diffusion coefficient in the semi-crystalline polymer and the degree of crystallinity were known, the amorphous diffusion coefficient was calculated. Table IV contains the transport parameters of diffusion coefficient (D), sorption coefficient (S), and permeability coefficient (P) for three different vinyl alcohols and various polyketone polymers. The sorption coefficient (S) represents the level of dissolved gas at equilibrium. The three transport parameters are related by the equation:

$$P = D \cdot S$$

The water transmission rates of Table IV were determined at 90% relative humidity and at the given temperatures.

Illustrative Embodiment 11

A linear alternating terpolymer 055/031 of carbon monoxide, ethylene and propylene, (6.2% $C_3$), was produced by contacting the monomers in the presence of a catalyst composition formed from palladium acetate, the anion of trifluoroacetic acid and 1,3-bis-(diphenylphopshino)propane. 1.3% of an unknown stabilizer was added to the polymer. The melting point of the terpolymer was 219° C. and the terpolymer had a limiting viscosity number (LVN) of 1.30 measured at 100° C. in m-cresol.

Illustrative Embodiment 12

A linear alternating copolymer 054/005 of carbon monoxide, and ethylene was produced by contacting the monomers in the presence of a catalyst composition formed from palladium acetate, the anion of trifluoroacetic acid and 1,3-bis-(diphenylphosphino)propane. No stabilizer was added to the polymer. The melting point of the copolymer was 257° C. and the copolymer had a limiting viscosity number (LVN) of 3.05 measured at 100° C. in m-cresol.

Illustrative Embodiment 13

A linear alternating copolymer 055/004 of carbon monoxide, and ethylene was produced by contacting the monomers in the presence of a catalyst composition formed from palladium acetate, the anion of trifluoroacetic acid and 1,3-bis-(diphenylphosphino)propane. No stabilizer was added to the polymer. The melting point of the copolymer was 257° C. and the copolymer had a limiting viscosity number (LVN) of 1.04 measured at 100° C. in m-cresol.

TABLE III

Water Vapor Transmission Rates

A. Comparison with Manufacturer Data (90% relative humidity (RH) and 100° F.)

| Film | Shell Measurement | Reported Value From Manufacturer | Source |
|---|---|---|---|
| EVAL-XL[1] | 1.46 | 1.52 | Kurary |
| EVAL-E[2] | 0.545 | 0.4–1.4 | Kurary |
| EVAL-F[3] | 1.97 | 0.95–3.8 | Kurary |

B. Polyketone Data (90% relative humidity (RH) and Given Temperature)

| Sample | LVN | Thickness | 15° C. | 20° C. | 25° C. | 30° C. | 35° C. | 40° C. |
|---|---|---|---|---|---|---|---|---|
| Polyketone Terpolymers | | | | | | | | |
| 055/014 | 1.9 | 10.9 | 2.14 | 3.28 | 5.23 | 7.69 | 11.0 | 18.3 |
| 055/012 | 1.37 | 8.8 | 2.07 | 3.30 | 5.42 | 8.10 | 12.0 | 17.5 |
| 055/012 | 1.37 | 8.8 | 2.38 | 3.88 | 6.23 | 9.44 | 13.8 | 20.0 |
| 055/031 | 1.30 | 8.8 | 2.77 | 5.32 | 7.29 | 10.3 | — | 15.7 |
| 055/031 | 1.30 | 6.2 | 1.65 | 3.74 | 5.89 | 8.40 | — | 13.6 |
| Polyketone Copolymers | | | | | | | | |
| 055/010 | 2.2 | 10.3 | 2.53 | 3.97 | 6.15 | 8.67 | 12.3 | 17.1 |
| 055/010 | 2.2 | 10.3 | 3.28 | 5.18 | 8.04 | 11.4 | 16.0 | 22.1 |
| 054/005 | 3.3 | 12.5 | 5.48 | 8.65 | 13.4 | 19.5 | 27.2 | 38.8 |
| 055/004 | 1.0 | 7.8 | 2.49 | 3.72 | 5.49 | 7.44 | 10.5 | 14.2 |
| 055/004 | 1.0 | 7.8 | 2.37 | 3.63 | 5.22 | 7.59 | 9.77 | 13.1 |

All permeability values in units of gm-mil/100 sqin-d.
[1] EVAL-XL as available in 1986.
[2] EVAL-EP.
[3] EVAL-F.

TABLE V

| Gas Transport Properties of Carbon Dioxide in Carilon EP and EVAL Neat Polymers | | | |
|---|---|---|---|
| Polymer | D | S | P |
| Carilon-EP 055/037 | 0.64 | 0.037 | 39.4 |
| EVAL[1] | 0.42 | 0.0001 | 0.05 |

NOTE:
values not corrected for crystallinity
units at 25° C.
D - $10^{-9}$ cm$^2$/s
S - cm$^3$(STP)/cm$^3$ - cm Hg
P - cm$^3$(STP)-mil/100 sqin-d-atm
[1] EVAL here was EVAL EPF from Kurary.

Illustrative Embodiment 14

A series of blends of the polyketone polymer of Illustrative Embodiment I and amounts by weight of a polyvinyl alcohol, known as EVAL-EP-F available from Kurary in 1986 were blended together in a 15mm twin screw Baker Perkins extruder and are referred to hereafter as formulations 1–6. Approximately 0.5% by weight, based on total blend, of Irganox 1076, a commercial phenolic antioxidant, was added to the formulation. The extruder was operated at 240° C. using undried feed and under a nitrogen blanket. The extruder was operated at 300 RPM and the extruded strand was passed directly into water. The feed rate was such as to produce maximum torque and the residence time was 0.5 minutes.

Nibs were formed from the extrudate and molded into plaques of approximately 4 in.×4 in.×0.05 in dimension by injection molding. The blends were then tested for oxygen, $H_2O$, $CO_2$ and the results appear in Table VI.

TABLE VI

EVAL/Carilon Blends

| FORMULATION | PK wt % | EVAL wt % | IRGANOX wt % | $PO_2{}^a$ | $PCO_2{}^a$ | $WVTR^b$ |
|---|---|---|---|---|---|---|
| 1 | 100 | 0 | 0 | 7.22 ±0.67 | 15.9 | 15.2 ±2.6 |
| 2 | 99.5 | 0 | 0.5 | 7.22 ±0.12 | 15.7 ±1.4 | 13.9 ±1.4 |
| 3 | 98.5 | 1.0 | 0.5 | 11.1 ±3.0 | 15.3 ±3.8 | — |
| 4 | 94.5 | 5.0 | 0.5 | 7.49 | 14.5 | — |
| 5 | 89.5 | 10.0 | 0.5 | 4.8 | — | — |
| 6 | 79.5 | 20.0 | 0.5 | 3.33 | 8.91 | 17.5 |

$^a$Oxygen and carbon dioxide permeability units cc(stp-mil/100 in$^2$-d-atm
$^b$Water permeability units gm-mil/100in$^2$-d

What is claimed:

1. A composition comprising:
    component (a): at least one linear alternating polymer of carbon monoxide and an ethylenically unsaturated hydrocarbon; and
    component (b): a vinyl alcohol polymer containing at least 30 mol percent vinyl alcohol units.

2. The composition of claim 1, wherein said linear alternating polymer is of the formula $$\text{—}[\text{—CO—}(CH_2\text{—}CH_2)]\text{—}_x\text{—}[\text{—CO—}(B)\text{—}]\text{—}_y\text{—}$$

wherein B is the moiety of an ethylenically unsaturated α-olefin of at least 3 carbon atoms polymerized through the ethylenic unsaturation, the total molar ratio of y:x is no more than about 0.5.

3. The composition of claim 1, wherein said linear alternating polymer is of the formula $$\text{—}[\text{—CO—}(CH_2\text{—}CH_2)]\text{—}_x\text{—}[\text{—CO—}(B)\text{—}]\text{—}_y\text{—}$$

wherein B is the moiety of an ethylenically unsaturated α-olefin of at least 3 carbon atoms polymerized through the ethylenic unsaturation, and wherein group B of said linear alternating polymer is propylene and the total molar ratio of y:x is from about 0.01 to about 0.2.

4. The composition of claim 2, wherein y is zero.

5. The composition of claim 1, wherein the ratio of component (a) to component (b) is between about 1:99 and 99:1.

6. The composition of claim 1, wherein the vinyl alcohol polymer is comprised of polyvinyl alcohol units.

7. The composition of claim 1, wherein the vinyl alcohol polymer is at least 30% by mol vinyl alcohol units and up to 50% by mol of ethylene/vinyl alcohol units.

8. An article of manufacture prepared from a composition comprising:
    component (a): at least one linear alternating polymer of carbon monoxide and an ethylenically unsaturated hydrocarbon; and
    component (b): a vinyl alcohol polymer containing at least 30 mol percent vinyl alcohol units.

9. The article of claim 8, wherein said linear alternating polymer is of the formula $$\text{—}[\text{—CO—}(CH_2\text{—}CH_2)]\text{—}_x\text{—}[\text{—CO—}(B)\text{—}]\text{—}_y\text{—}$$

wherein B is the moiety of an ethylenically unsaturated α-olefin of at least 3 carbon atoms polymerized through the ethylenic unsaturation, the total molar ratio of y:x is no more than about 0.5.

10. The article of claim 8, wherein said linear alternating polymer is of the formula $$\text{—}[\text{—CO—}(CH_2\text{—}CH_2)]\text{—}_x\text{—}[\text{—CO—}(B)\text{—}]\text{—}_y\text{—}$$

wherein B is the moiety of an ethylenically unsaturated α-olefin of at least 3 carbon atoms polymerized through the ethylenic unsaturation, and wherein group B of said linear alternating polymer is propylene and the total molar ratio of y:x is from about 0.01 to about 0.2.

11. The article of claim 9, wherein y is zero.

12. The article of claim 8, wherein the ratio of component (a) to component (b) is between about 1:99 and 99:1.

13. The article of claim 8, wherein the vinyl alcohol polymer is comprised of polyvinyl alcohol units.

14. The article of claim 8, wherein the vinyl alcohol polymer is at least 30% by mol vinyl alcohol units and up to 50% by mol of ethylene/vinyl alcohol units.

15. A packaging material wherein said material exhibits oxygen permeability of less than 15 cc mil/100 in$^2$ 24 hr atm at 30° C. and water vapor transmission of less than 20 grams mil/100 inch$^2$/24 hr at 38° C. and 90% relative humidity (RH), and comprises:
    component (a): at least one linear alternating polymer of carbon monoxide and an ethylenically unsaturated hydrocarbon; and
    component (b): a vinyl alcohol polymer containing at least 30 mol percent vinyl alcohol units.

16. The material of claim 15, wherein said linear alternating polymer is of the formula

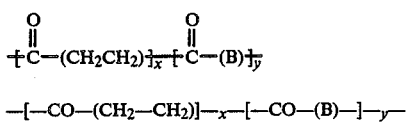

$$-[-CO-(CH_2-CH_2)]-_x-[-CO-(B)-]-_y-$$

wherein B is the moiety of an ethylenically unsaturated α-olefin of at least 3 carbon atoms polymerized through the ethylenic unsaturation, the total molar ratio of y:x is no more than about 0.5.

17. The material of claim 15, wherein said linear alternating polymer is of the formula

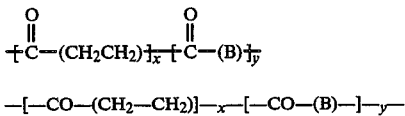

$$-[-CO-(CH_2-CH_2)]-_x-[-CO-(B)-]-_y-$$

wherein B is the moiety of an ethylenically unsaturated α-olefin of at least 3 carbon atoms polymerized through the ethylenic unsaturation, and wherein group B of said linear alternating polymer is propylene and the total molar ratio of y:x is from about 0.01 to about 0.2.

18. The material of claim 16, wherein y is zero.

19. The material of claim 15, wherein the ratio of component (a) to component (b) is between about 1:99 and 99:1.

20. The material of claim 15, wherein the vinyl alcohol polymer is comprised of polyvinyl alcohol units.

21. The material of claim 15, wherein the vinyl alcohol polymer is at least 30 mol% vinyl alcohol units and up to 50% by mol of ethylene/vinyl alcohol units.

22. The material of claim 15, wherein said packaging material is at least one layer that comprises component (a) and component (b).

23. An article of the material in claim 15.

24. A container of the material in claim 15.

* * * * *